Feb. 9, 1954  M. J. KWARTZ  2,668,900
FUEL VAPORIZER FOR INTERNAL-COMBUSTION ENGINES
Filed June 21, 1950
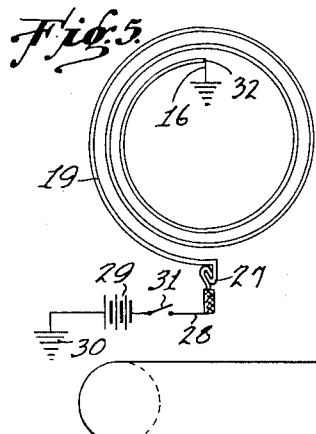
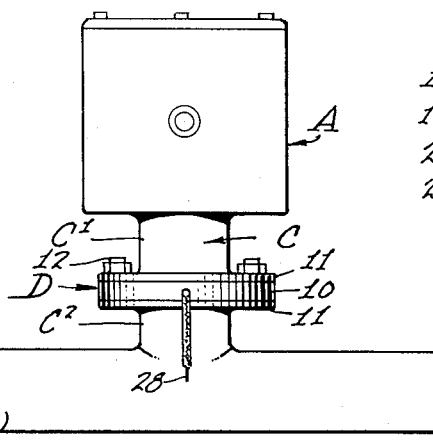
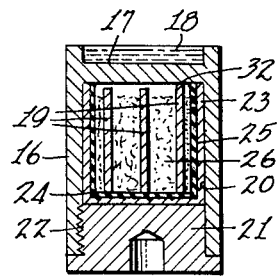
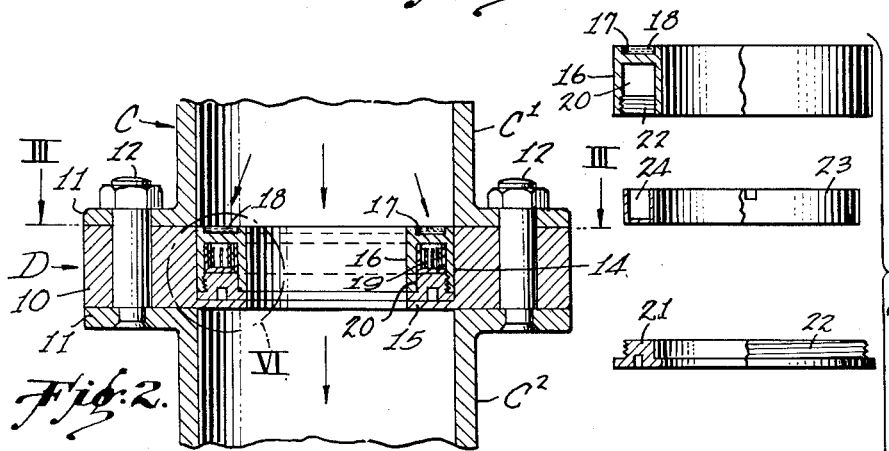
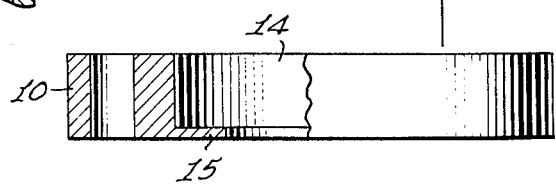
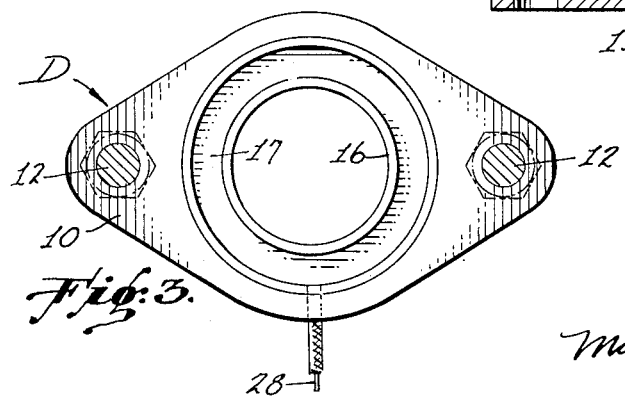
INVENTOR.
MICHAEL J. KWARTZ
BY
Munn, Liddy & Glaccum
ATTORNEYS Patented Feb. 9, 1954

2,668,900

UNITED STATES PATENT OFFICE 2,668,900

FUEL VAPORIZER FOR INTERNAL-COMBUSTION ENGINES

Michael J. Kwartz, Van Nuys, Calif., assignor of one-half to Grace M. Trankla, Van Nuys, Calif.

Application June 21, 1950, Serial No. 169,355

4 Claims. (Cl. 219—38)

1

The present invention relates to a fuel vaporizer for an internal combustion engine; and has particular reference to increasing the general efficiency of the engine for the fuel employed therein.

Broadly speaking, I provide a fuel vaporizer arranged in the fuel-conveying conduit leading from a carburetor to an intake manifold. This vaporizer is adapted to convert liquid gasoline and diesel fuel oil into a thoroughly vaporized state before reaching the cylinders of the engine, thus obtaining improved performance of the engine with greater fuel economy.

Moreover, I propose to utilize diesel fuel oil along with gasoline, and at the same time eliminate excessive exhaust smoke and fumes, this being accomplished by assuring vaporizing of these fuels prior to injection into the engine.

As a further object of the invention, I provide a vaporizer of the character described that will function in the capacity of a booster in starting an engine in a cold climate; as vaporized fuel is more readily combustible than liquid fuel.

Other objects and advantages will appear as the specification continues. The novel features of my invention will be pointed out in the claims hereunto annexed.

Drawing

For a better understanding of my invention, reference should be had to the accompanying drawing, forming part of this application, in which:

Figure 1 is a side elevational view illustrating my fuel vaporizer interposed in a fuel-conveying conduit leading from a carburetor to an intake manifold;

Figure 2 is a vertical transverse sectional view taken through my vaporizer and portions of the fuel-conveying conduit;

Figure 3 is a horizontal sectional view taken along the line III—III of Figure 2;

Figure 4 is a separated view disclosing the fuel collector, the casing for a heating element, the ring, and adaptor of the vaporizer, portions being shown in section;

Figure 5 is a plan view of the heating element, and further shows a wiring diagram; and Figure 6 is an enlarged sectional view of that portion of the vaporizer enclosed by the circle VI in Figure 2.

While I have shown only the preferred form of my invention, it should be understood that various changes or modifications may be made within the scope of the annexed claims without departing from the spirit thereof.

2

Detailed description

Referring to the drawing, I have illustrated a down-draft carburetor indicated generally at A, which is connected to an intake manifold B by a fuel-conveying conduit C. The manifold, of course, delivers fuel to the cylinders of an internal combustion engine (not shown) in the conventional manner.

The fuel to be employed consists of a mixture of gasoline and diesel fuel oil, which may be mixed in the desired proportion. I have found that 60% gasoline and 40% diesel fuel oil give excellent results, with the engine producing no smoke during operation. However, I do not wish to be limited to these percentages. It will be appreciated that diesel fuel oil is relatively cheap as compared with gasoline.

My fuel vaporizer is designated generally at D. In its structural features, this vaporizer includes an adaptor 10, which is interposed between companion flanges 11 provided on confronting sections C1 and C2 of the fuel-conveying conduit. Studs 12 are used for drawing the flanges 11 upon the interposed adaptor.

As shown in Figures 2 and 4, the adaptor 10 has a passageway 14 extending therethrough for flow of fuel from the carburetor to the manifold. This adaptor defines a horizontal flange 15 projecting inwardly of the passageway.

It will be noted from Figure 2 that a ring-shaped fuel collector 16 is disposed in the passageway 14. In detail, the collector has an upwardly-opening annular groove 17 in its upper surface, which faces toward the carburetor, and is arranged horizontally. This groove provides a receptacle adapted for catching liquid fuel 18 flowing downwardly through the conduit C.

For the purpose of vaporizing the liquid fuel caught in the groove 17, I make use of a heating element 19, which is encased within the collector 16. This heating element is accommodated in an annular recess 20 extending upwardly into the collector. A ring 21 is secured to the bottom of the collector so as to form a closure over the recess 20 and to hold the heating element in place. This may be accomplished by interengaging threads 22 provided between the collector 16 and the ring 21, although other fastening means may be provided therebetween. The ring 21 rests upon the flange 15 when the vaporizer is assembled.

The heating element 19 consists of a spiral-shaped metallic ribbon, whih is mounted in an annular casing 23 having a channel-shaped cross-section. The element 19 is inserted into the channel 24 of this casing, and is insulated therefrom by mica sheets 25. Asbestos pulp 26, or other insulation, is packed between the convolutions of the heating element (see Figure 6).

Any suitable circuit may be provided for supplying electricity to the heating element. As shown in Figure 5, the outer end of this element is connected by a spring prong 27 to a lead-in wire 28. In turn, this wire is connected to a source of electricity 29, and the latter may be grounded, as at 30. For controlling the circuit, I have shown a switch 31 therein. In order to complete the electrical circuit, I have disclosed the inner end 32 of the heating element as being grounded to adaptor.

Obviously, the ring 21 may be unthreaded, and the casing 23 with its heating element 19 removed as a unit. This will allow a new heating unit to be inserted into the recess 20, after which the ring 21 may be replaced.

*Summary of operation*

Assuming that my vaporizer D is interposed in the fuel-conveying conduit C between the carburetor A and the intake manifold B, the operation is summarized briefly as follows:

As liquid fuel, such as a mixture of gasoline and diesel fuel oil, are drawn downwardly through the conduit C, a considerable amount thereof will be caught in the annular groove 17. With the heating element 19 activated by closing the switch 31, the liquid fuel disposed in the groove 17 will be heated to a vaporizing temperature.

This action will split the molecules and release more energy prior to combustion. When the energy is thus released, results are understood readily as there is more energized fuel available when the combustion takes place. This enables the conversion of a conventional gasoline engine into a diesel-consuming engine, eliminating excessive exhaust smoke and fumes. The "activating action" results in a greater fuel economy and improves the performance of the engine.

As previously stated, my device has an additional purpose of serving as a booster in starting a motor in a cold climate, as vaporized fuel is more readily combustible than liquid fuel.

I claim:

1. In a fuel vaporizer for an internal combustion engine: a fuel collector interposed in a fuel-conveying conduit leading from a down-draft carburetor to an intake manifold; the collector defining an upwardly-opening annular groove facing toward the carburetor and being disposed adjacent to the inner wall of the fuel-conveying conduit throughout its entire circumference for catching liquid fuel passing downwardly through the conduit; and means for heating the fuel thus caught to a vaporizing temperature.

2. In a fuel vaporizer for an internal combustion engine: an adaptor having a passageway extending therethrough; the adaptor defining a horizontal flange projecting inwardly of the passageway; a ring-shaped fuel collector disposed in the passageway of the adaptor; the collector having an upwardly-opening annular groove in an upper surface of the collector for catching liquid fuel passing downwardly through the passageway; the collector having an annular recess extending upwardly thereinto from a lower surface of the collector; an annular casing having a channel-shaped cross-section provided with a heating element mounted in its channel; this casing being arranged in the underneath annular recess of the collector; and a ring forming a closure over this recess, and retaining the casing in place; the ring resting on the horizontal flange of the adaptor.

3. In a fuel vaporizer for an internal combustion engine: an adaptor having a passageway extending therethrough; a ring-shaped fuel collector disposed in the passageway of the adaptor; the collector having an upwardly-opening annular groove in its upper surface for catching liquid fuel passing downwardly through the passageway; the collector having an annular recess disposed below the fuel-catching annular groove; and a heating element mounted in the annular recess for heating the fuel collector and vaporizing any fuel collected in the annular groove.

4. A fuel vaporizer as set forth in claim 3; and in which an annular casing carries the heating element and is removably received in the annular recess.

MICHAEL J. KWARTZ.

References Cited in the file of this patent

UNITED STATES PATENTS

| Number | Name | Date |
|---|---|---|
| 1,424,898 | Gorman | Aug. 8, 1922 |
| 1,783,536 | Godward | Dec. 2, 1930 |
| 2,175,738 | Betry | Oct. 10, 1939 |
| 2,587,713 | Elliott et al. | Mar. 4, 1950 |
| 2,597,251 | Mansoff | May 20, 1952 |